United States Patent
Johnson et al.

[11] Patent Number: 6,161,023
[45] Date of Patent: Dec. 12, 2000

[54] ROTATING LOBE ACCESS METHOD

[75] Inventors: Torbjörn Johnson, Järfälla; Bo G. Magnusson, Djursholm, both of Sweden

[73] Assignee: Radio Design Innovation TJ AB, Kista, Sweden

[21] Appl. No.: 09/147,214

[22] PCT Filed: Mar. 24, 1997

[86] PCT No.: PCT/SE97/00502

§ 371 Date: Dec. 29, 1998

§ 102(e) Date: Dec. 29, 1998

[87] PCT Pub. No.: WO97/41705

PCT Pub. Date: Nov. 6, 1997

[30] Foreign Application Priority Data

Apr. 29, 1996 [SE] Sweden ................................. 9601615

[51] Int. Cl.⁷ ....................................................... H04B 1/38
[52] U.S. Cl. ........................ 455/562; 455/502; 455/343
[58] Field of Search ............................. 455/561, 562, 455/450, 524, 502, 38.3, 343; 370/350, 503, 508–510

[56] References Cited

U.S. PATENT DOCUMENTS

| | | |
|---|---|---|
| 5,109,530 | 4/1992 | Stengel . |
| 5,448,753 | 9/1995 | Ahl et al. . |
| 5,488,737 | 1/1996 | Harbin et al. . |
| 5,566,355 | 10/1996 | Kanai ......................... 455/450 |
| 5,590,396 | 12/1996 | Henry ....................... 455/38.3 |
| 5,966,670 | 10/1999 | Keskitalo et al. ......... 455/562 |
| 5,978,369 | 11/1999 | Silvestre et al. .......... 370/350 |
| 5,991,635 | 11/1999 | Dent et al. ................ 455/517 |

FOREIGN PATENT DOCUMENTS

| | | |
|---|---|---|
| 0 499 440 | 2/1992 | European Pat. Off. . |
| 2 260 050 | 3/1993 | United Kingdom . |
| 2 266 998 | 11/1993 | United Kingdom . |
| WO 93/23965 | 11/1993 | WIPO . |
| WO 96/00484 | 1/1996 | WIPO . |

*Primary Examiner*—Reinhard J. Eisenzopf
*Assistant Examiner*—Duc Nguyen
*Attorney, Agent, or Firm*—Oblon, Spivak, McClelland, Maier & Neustadt, P.C.

[57] ABSTRACT

An access method using a rotating lobe in a telecommunication system that has antennas that support a number of horizontal lobes for communication between a base station and a mobile station. Signals to and from the antennas are modulated by a lobe shaping unit to bring the lobe to rotate in a horizontal plane, that the mobile station synchronizes with the base station transmission lobe by means of an internal clock, and after achieving synchronization goes into a sleep mode. The sleep mode has a number of wake up levels, wherein the mobile station in the deepest level listens for wake up calls and in the highest level listens for the proper message.

23 Claims, 1 Drawing Sheet

ROTATING LOBE ACCESS METHOD

FIELD OF THE INVENTION

The present invention relates to a rotating lobe access method. The main ideas of the invention are in the field of access, paging and call set-up procedures for conventional FDMA and TDMA mobile radio systems such as mobile telephone and PMR (Private Mobile Radio) systems. Another application of the invention is location systems.

The invention simplifies making fast and simple initial acquisition, paging, or call set up, both in downlink and uplink in mobile radio systems. The invention can be used in FDMA and TDMA systems and their hybrids working either in FDD (Frequency Division Duplex) or TDD (Time Division Duplex).

The invention is related to the following patent applications with the same filing date as the present application or to be filed in the near future, having the same owner as the present application and entitled:

METHOD AND ARRANGEMENT OF CONVERTING A CELLULAR TELECOMMUNICATION SYSTEM;
ANTENNA SYSTEM;
ADAPTIVE AIR INTERFACE.

STATE OF THE ART

Omnidirectional or 120° sector antennas for access and communication are most common today in mobile communication systems. Problem areas are difficulties achieving high sensitivity and/or range. One solution today is using very high power in the base station (BS). However, this may create increased interference levels and low power consumption is generally desired.

The present invention, on the other hand, proposes using a narrow rotating lobe and achieving reply from the mobile station in the same, or somewhat delayed receiving lobe, resulting in the following advantages:

The suggested method increases sensitivity and/or range and capacity using the narrow lobe system.

The method is power efficient, avoiding high output power from the base station.

The mobile station gives fixed delay+variable delay.

Maximum paging sensitivity is obtained by high antenna gain.

Selective paging, i.e. paging in preferred directions sectors or ranges, enhances capacity, e.g. first transmission in last reported direction. This saves unnecessary emission.

Power control avoids hard capacity limits and will therefore introduce soft degradation.

Standard hardware, as used for conventional methods, can be used.

The actual page time depends on data rate, number of data bits to be transferred.

Paging channels support nominal 600 b/s, but optionally (1/16, 1/8, 1/4, 1/2, 2, 4, 8)×600 b/s.

The lower data rate, the higher sensitivity is obtained (in principle 3-dB is gained for each reduction of the data rate by a factor 2).

The paging channel is treated similarly to an adaptive air interface, see our above-mentioned patent application.

The invention provides increased sensitivity and less mobile station power and complexity.

No delay equaliser is needed for the paging channel, due to low data rates and narrow lobes.

SUMMARY OF THE INVENTION

Thus, the present invention provides a rotating lobe access method in a telecommunication system including at least one base station and a number of mobile stations and having antenna means supporting a number of horizontal lobes for communication between the base station and the mobile stations.

In accordance with the invention signals to and from the antenna means are modulated by a lobe shaping unit to bring the lobe to rotate, or appear to rotate, in a horizontal plane. Also, rotations or sweeps in different vertical angles are possible.

In accordance with a preferred embodiment of the invention, the method uses separate transmission and reception lobes and the reception lobe is a delayed replica of the transmission lobe.

In a second aspect of the invention, the mobile station after achieving synchronisation with the base station transmission lobe, goes into a sleep mode.

In a further aspect of the invention, the base station estimates the position of a mobile station by determining the azimuth angle and the distance by timing the time delay of the mobile station reply.

Also, the mobile station is capable of calculating its position using triangulation by listening to at least two base stations for obtaining the azimuth angles and distances to the respective base stations.

BRIEF DESCRIPTION OF THE DRAWINGS

The invention will be described in detail below with reference to the accompanying drawings in which.

DETAILED DESCRIPTION OF PREFERRED EMBODIMENTS

The present invention provides an access method using a rotating lobe for the communication between the base station BS and the mobile stations MS. The downlink is carried out in one transmission lobe and the uplink is carried out in the same, or a somewhat delayed, receiving lobe. The mobile station gives fixed delay+variable delay. The fixed delay is set such that the mobile station responds in the correct time slot while the variable delay depends on the distance from the base station to the mobile station.

In the downlink, useful information is obtained from the MS reply, such as horizontal location information (azimuth), paging reply information, and distance information by timing the time delay.

The same idea can be applied in the uplink, in which case the MS access information is repeated in a number of intervals to be certain of hitting the rotating lobe, thereby making communication in the link possible.

Figure 1:
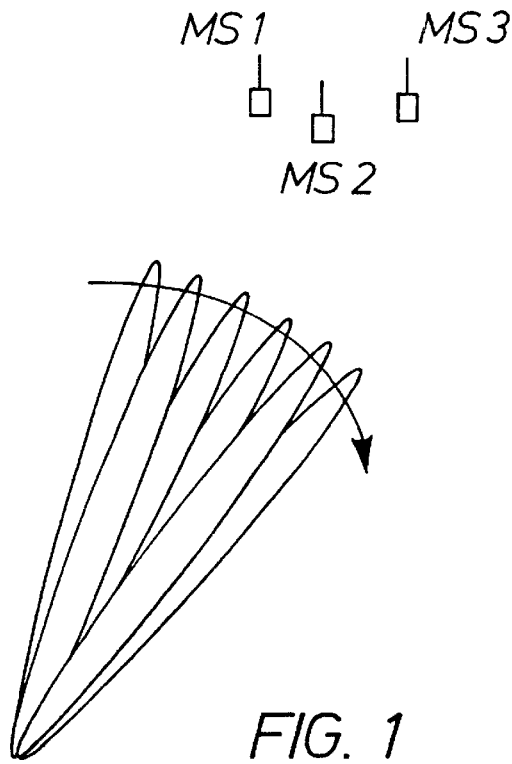
FIG. 1 is a schematic view of a rotating lobe as utilised in the present invention.

In FIG. 1 a narrow lobe may be seen as rotating in the clockwise direction for communication with three mobile stations MS1, MS2, and MS3. The rotating lobe may be regarded as a continuously swept lobe or a switching between fixed lobes in different directions. Since the different lobes do not interfere with each other, the same frequency may be used, which greatly increases the available frequency spectrum.

The lobe is rotated using the following method. An antenna lobe is created using N antenna elements positioned either in a linear array or any other arrangement i.e. a conformal (non-linear) array. (See e.g. our above-mentioned patent application ANTENNA SYSTEM.)

A rotating lobe is created by using either a set of fixed coefficients which are applied sequentially or continuously variable coefficients. In both cases the varying coefficients bring the lobe to rotate or appear to rotate.

The rotation is performed in clockwise or counterclockwise direction. Also a pseudorandom sweep through all sectors can be performed by hopping through the sectors in pseudorandom order. This may reduce the risk of interference with neighbouring base station coverage areas.

The rotation is implemented by a weighting device called lobe shaping unit (LSU) in which N complex weighting coefficients, N magnitude and N phase weights, are multiplied with a signal going to (or coming in the reverse direction from) each of the N antenna elements. The N complex weighting coefficients are computed with the precondition of low side lobe levels.

The present invention may also support vertical lobes, that is lobes having different vertical angles for reaching different ranges from the base station, for introducing a further diversity or capacity increase.

The lobe forming results in the following properties:

Less C/I (carrier/interference) problem in a narrow lobe;

Less delay spread in a narrow lobe system relative wide broadcast modes;

Support for vertical lobes for different range areas; Sectored lobe power control introduced resulting in that coverage area can be adapted to various traffic patterns.

In the downlink a quick mobile station location at first access request is obtained, the mobile response giving azimuth angle directly, and coarse distance to the mobile station. The base station may send, every 30th second or more frequently, its co-ordinates and azimuth angle. The mobile station can autonomously determine its position using triangulation by listening to at least two base stations. This is a location function, similar to the global positioning system (GPS).

Also the uplink is scanned, with a delay time td permitted. Lobe gains can be obtained this way and fast uplink acquisition.

Figure 2:
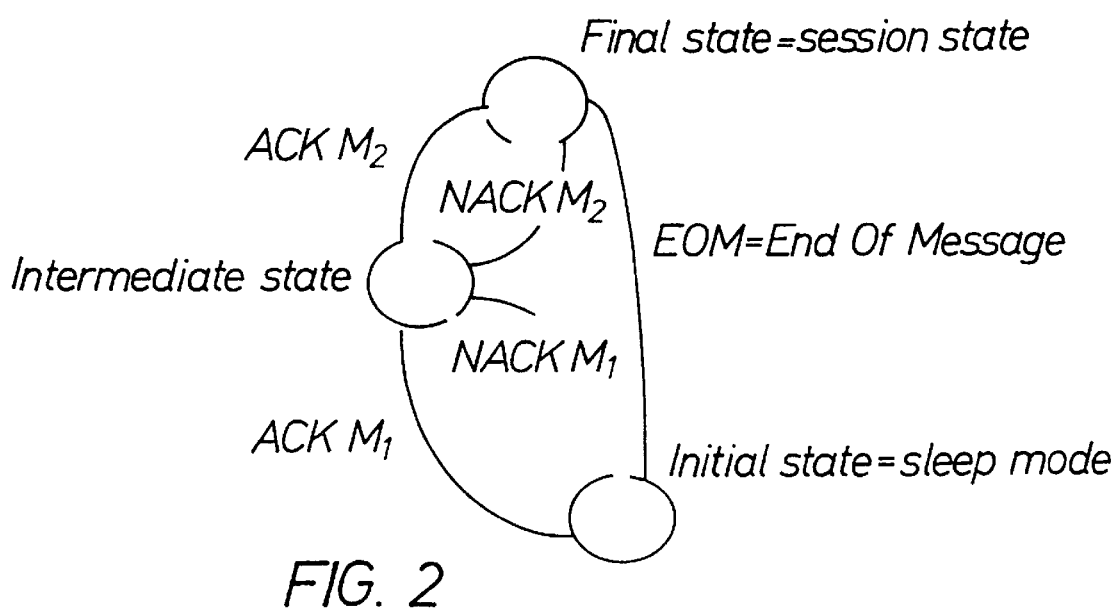
FIG. 2 is state diagram of a sleep mode function having 3 levels in accordance with the invention.

Advanced sleep mode with burst duty cycles down to 0.5 ms/30 s is introduced to save battery power and spectrum. FIG. 2 shows an example of a state diagram of the sleep mode function in accordance with the present invention. Assume that the mobile initially is in sleep mode. After receiving the first paging or acknowledgement message ACK $M_1$ which is short, 8–16 bits, the motile station goes to an intermediate state and expects one or more new paging messages ACK $M_2$ to reach the final state, that is the session state, in order to receive the message proper. The first message ACK $M_1$ "awakes groups" of mobile stations, and the succeeding paging messages ACK $M_2$ completes the paging session. If the mobile station in the intermediate state receives a negative acknowledgement message NACK $M_1$ or in the final state receives a negative acknowledgement message NACK $M_2$, the mobile station returns to the next lower level. The present invention proposes up to five levels of sleep mode states. The following features will be included:

Long delay power saving sleep mode;

Software controlled, 0.2–30 s, sleep time;

Sleep mode factor dependent on measured battery capacity left;

Sleep mode is dependent of the applied paging channel data rate;

Sleep mode listens in at least 3 levels of wake up;

Up to 5 pages sequentially until response is obtained.

Downlink

The paging, access or call set-up message is transferred in a short interval message time $t_m$. The message time is short compared to the dwell time $t_{dw}$ of the lobe according to the following formulas $$t_m < t_{dw}$$

$$t_{dw} = t_{sw}/N$$

where

N=number of sectors or lobes $t_{sw}$=sweep time (=duration of one revolution)

Example: N=64, $t_{sw}$=480 ms, $t_{dw}$=7.5 ms, i.e., $t_m$<7.5 ms, $t_m$<3.5 ms ($\approx t_{dw}/2$) preferred.

First a number of paging attempts are performed in the latest reported direction of the mobile station. If necessary, then a number of paging attempts are performed in a wider sector encompassing the sector of the latest reported direction. Finally, a paging attempt scanning a full horizontal revolution is performed, if none of the previous attempts are successful. This may be the case when a mobile station has moved outside its sector in sleep mode.

Power reduction in certain selected directions is proposed in order to save power and capacity. This deliberately reduces the coverage area, but reduces the interference in neighbouring areas, and acts as a soft limitation of the calling capacity.

The same frequency can be reused in different directions (sweeping lobes). Hence the capacity is increased.

Uplink

The receiving lobe is a delayed replica of the transmitting lobe. The delay is m lobe widths, or m dwell times, behind the transmitting lobe. The mobile station answering delay is adjusted accordingly.

The uplink is treated in the following fashion: the mobile station receiver duty cycle is low in order to save power. The mobile station listens to the closest base station for a long enough time to get lobe synchronisation timing information. Each mobile station is preferably provided with an internal frequency generator in order to generate a stable clock (±10 ppm) to maintain the synchronisation. Following this phase, the mobile is ready to receive a message in the correct time slot, $t_{dw}$, long, of the rotating lobe.

The maximum delay thus created is one revolution, which is of the order of 0.5 s according to the example given above. By using two receivers, each having a separate receiving lobe, the delay will be reduced to half the revolution time.

Hand-off

The mobile station should of course be allowed to move between different lobes of the base station. The present invention provides "hand-off" between its lobes in analogy with hand-off between separate base stations. The invention proposes two kinds of hand-off (HO) schemes:

Hard Hand-Off (HHO) or hard sector hand-off, meaning HO to a new frequency when entering an adjacent sector. Conventional criteria such as signal strength, signal to interference, bit error rate (BER) are used;

Soft Sector Hand-Off (SSHO), meaning that the base station is switched to the new sector, if possible. In other words, this means that the base station frequency follows the moving mobile station. The scheme works only if the frequency to be switched over to the new sector is not used in that sector. If the frequency is not available a HHO is performed.

Thus, the present invention provides a rotating lobe access method having the advantages as stated above. The invention is only limited by the claims below.

What is claimed is:

1. Rotating lobe access method in a telecommunication system including at least one base station and a number of mobile stations and having an antenna supporting a number of horizontal lobes for communication between the base station and the mobile stations, characterized in that signals to and from the antenna are modulated by a lobe shaping unit to bring the lobe to rotate in a horizontal plane, that the mobile station synchronizes with the base station transmission lobe by means of an internal clock, and after achieving synchronization goes into a sleep mode, which sleep mode has a number of wake up levels, wherein the mobile station in the deepest level listens for wake up calls and in the highest level listens for a message.

2. Method according to claim 1, characterized in that the mobile station only listens to the base station during the interval in which the base station transmission lobe is transmitted in the direction of the mobile station.

3. Method in accordance with any one of claims 1 or 2, characterized in that the sleep mode has at least three wake up levels, wherein the mobile station in the deepest level listens for group wake up calls, in the next level listens for an individual wake up call, and in the highest level listens to the proper message.

4. Method in accordance with any one of claims 1 to 2, characterized in that the sleep mode is dependent of the battery power remaining in the mobile station.

5. Method according to any of claims 1–2, characterized in that the signals to and from the antenna are multiplied by N complex weighting coefficients to create different lobes.

6. Method according to claim 1, characterized in that each lobe has a dwell time $t_{dw}$ and a paging, access or call set-up message is transmitted in a message time $t_m$, and $t_m < t_{dw}$.

7. Method according to claim 1, characterized in that fixed weighting coefficients are applied sequentially to the signals to and from the antenna.

8. Method according to claim 1, characterized in that continuously variable weighting coefficients are applied sequentially to the signals to and from the antenna.

9. Method in accordance with claim 1, characterized in that the lobes are brought to rotate in a clockwise or counterclockwise direction.

10. Method in accordance with claim 1, characterized in that the lobes are brought to sweep a revolution by hopping through sectors in a pseudorandom order.

11. Method in accordance with claim 1, characterized in that the antenna supports at least two vertical lobes.

12. Method according to claim 11, characterized in that the antenna supports an upper and a lower lobe, wherein the upper and lower lobes are swept successively in each sector.

13. Method in accordance with claim 1, characterized by using separate transmission and reception lobes.

14. Method according to claim 13, characterized in that the reception lobe is a delayed replica of the transmission lobe.

15. Method in accordance with claim 1, characterized in that the base station estimates the position of a mobile station by determining the azimuth angle and the distance by timing the time delay of the mobile station reply.

16. Method in accordance with claim 1, characterized in that a mobile station calculates its position using triangulation by listening to at least two base stations for obtaining the azimuth angles and distances to the respective base stations.

17. Method in accordance with claim 1, characterized in that paging directed to a mobile station is first performed in the latest reported direction of the mobile station.

18. Method according to claim 17, characterized in that first a number of paging attempts is performed in the latest reported direction of the mobile station, and if necessary, then a number of paging attempts is performed in a wider sector encompassing the sector of the latest reported direction, and if necessary, a paging attempt scanning a full horizontal revolution is performed.

19. Method in accordance with any one of claim 1, characterized in that the power emitted in each lobe of the base station is controlled to control the shape of the base station coverage area.

20. Method in accordance with claim 1, characterized in that, when a mobile station moves between different lobes of the base station, a hand-off between the lobes of the base station is performed.

21. Method according to claim 20, characterized in that the base station frequency follows the mobile station, if the frequency is not used in the new sector.

22. Method according to claim 20, characterized in that the base station switches to a new frequency for the mobile station in the new sector.

23. Method according to claim 1, characterized in that each lobe has a dwell time $t_{dw}$ and a paging, access or call set-up message is transmitted in a message time $t_m$, the duration of the message time being less than about one half the dwell time.

* * * * *